(12) United States Patent
Kwan (10) Patent No.: US 7,876,772 B2
(45) Date of Patent: *Jan. 25, 2011

(54) SYSTEM, METHOD AND APPARATUS FOR PROVIDING MULTIPLE ACCESS MODES IN A DATA COMMUNICATIONS NETWORK

(75) Inventor: Philip Kwan, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 1634 days.

This patent is subject to a terminal disclaimer.

(21) Appl. No.: 10/631,898

(22) Filed: Aug. 1, 2003

(65) Prior Publication Data

US 2005/0025125 A1   Feb. 3, 2005

(51) Int. Cl.
H04L 12/42 (2006.01)

(52) U.S. Cl. ............................ 370/449; 709/216; 726/4; 726/27

(58) Field of Classification Search ................. 370/352, 370/449; 709/216; 726/4, 27
See application file for complete search history.

(56) References Cited

U.S. PATENT DOCUMENTS

| | | |
|---|---|---|
| 4,897,874 A | 1/1990 | Lidinsky et al. |
| 5,237,614 A | 8/1993 | Weiss et al. |
| 5,721,780 A | 2/1998 | Ensor et al. |
| 5,757,924 A | 5/1998 | Friedman et al. |
| 5,774,551 A | 6/1998 | Wu et al. |
| 5,812,819 A | 9/1998 | Rodwin et al. |
| 5,825,890 A | 10/1998 | Elgamal et al. |
| 5,892,903 A | 4/1999 | Klaus |
| 5,894,479 A | 4/1999 | Mohammed |
| 5,946,308 A | 8/1999 | Dobbins et al. |
| 5,958,053 A | 9/1999 | Denker |
| 5,974,463 A | 10/1999 | Warrier et al. |
| 6,021,495 A | 2/2000 | Jain et al. |
| 6,115,376 A | 9/2000 | Sherer et al. |
| 6,167,052 A | 12/2000 | McNeill et al. |

(Continued)

OTHER PUBLICATIONS

Cisco Systems, Inc., Chapter 9, Configuring 802.1X Port-Based Authentication, Catalyst 3550 Multilayer Switch Software Configuration Guide, Cisco IOS Release 12.1(13) EA1, Mar. 2003, pp. 1-18.

(Continued)

Primary Examiner—Seema S Rao
Assistant Examiner—Sai-Ming Chan
(74) Attorney, Agent, or Firm—Nixon Peabody LLP; John P. Schaub (57) ABSTRACT

A system, method and apparatus for providing multiple access modes in a data communications network includes a network access device having a plurality of input ports, a plurality of output ports, and a switching fabric for routing data received on the plurality of input ports to at least one of the plurality of output ports. Control logic within the network access device is adapted to determine whether a user device coupled to one of the plurality of input ports supports a user authentication protocol used by a host network. If the user authentication protocol is not supported, then the input port to which the network access device is coupled is placed in a semi-authorized access state that limits access to a pre-configured network accessible via the host network.

33 Claims, 8 Drawing Sheets

U.S. PATENT DOCUMENTS

| | | | |
|---|---|---|---|
| 6,167,445 | A | 12/2000 | Gai et al. |
| 6,212,191 | B1 | 4/2001 | Alexander et al. |
| 6,219,790 | B1 | 4/2001 | Lloyd et al. |
| 6,339,830 | B1 | 1/2002 | See et al. |
| 6,363,489 | B1 | 3/2002 | Comay et al. |
| 6,393,484 | B1 | 5/2002 | Massarani |
| 6,496,502 | B1 | 12/2002 | Fite |
| 6,510,236 | B1 | 1/2003 | Crane et al. |
| 6,519,646 | B1 | 2/2003 | Gupta et al. |
| 6,553,028 | B1 | 4/2003 | Tang et al. ............... 370/389 |
| 6,615,264 | B1 | 9/2003 | Stoltz et al. |
| 6,651,168 | B1 | 11/2003 | Kao |
| 6,728,246 | B1 | 4/2004 | Egbert et al. |
| 6,732,270 | B1 | 5/2004 | Patzer et al. |
| 6,775,290 | B1 | 8/2004 | Merchant et al. |
| 6,789,118 | B1 | 9/2004 | Rao |
| 6,807,179 | B1 | 10/2004 | Kanuri et al. |
| 6,853,988 | B1 | 2/2005 | Dickinson et al. |
| 6,874,090 | B2 | 3/2005 | See et al. |
| 6,892,309 | B2 | 5/2005 | Richmond et al. |
| 6,912,592 | B2 | 6/2005 | Yip |
| 6,950,628 | B1 | 9/2005 | Meier et al. |
| 6,959,336 | B2 | 10/2005 | Moreh et al. |
| 6,981,054 | B1 | 12/2005 | Krishna |
| 7,028,098 | B2 | 4/2006 | Mate et al. |
| 7,032,241 | B1 | 4/2006 | Venkatachary et al. |
| 7,062,566 | B2 | 6/2006 | Amara et al. |
| 7,079,537 | B1 | 7/2006 | Kanuri et al. |
| 7,093,280 | B2 | 8/2006 | Ke |
| 7,113,479 | B2 | 9/2006 | Wong |
| 7,188,364 | B2 | 3/2007 | Volpano |
| 7,194,554 | B1 | 3/2007 | Short et al. ............... 709/246 |
| 7,216,229 | B2 | 5/2007 | Hu |
| 7,249,374 | B1 | 7/2007 | Lear et al. ............... 726/6 |
| 7,302,700 | B2 | 11/2007 | Mao et al. |
| 7,360,086 | B1 | 4/2008 | Tsuchiya et al. |
| 7,493,084 | B2 | 2/2009 | Meier |
| 7,523,485 | B1 | 4/2009 | Kwan |
| 7,529,933 | B2 | 5/2009 | Palekar |
| 7,536,464 | B1 | 5/2009 | Dommety et al. |
| 7,562,390 | B1 | 7/2009 | Kwan |
| 7,567,510 | B2 | 7/2009 | Gai |
| 7,596,101 | B2 | 9/2009 | Oguchi |
| 2002/0016858 | A1 | 2/2002 | Sawada et al. |
| 2002/0133534 | A1 | 9/2002 | Forslow |
| 2002/0146002 | A1 | 10/2002 | Sato ............... 370/386 |
| 2003/0028808 | A1 | 2/2003 | Kameda |
| 2003/0037163 | A1 | 2/2003 | Kitada et al. |
| 2003/0046391 | A1 | 3/2003 | Moreh et al. |
| 2003/0051041 | A1* | 3/2003 | Kalavade et al. ............ 709/229 |
| 2003/0056063 | A1 | 3/2003 | Hochmuth et al. |
| 2003/0065944 | A1 | 4/2003 | Mao et al. |
| 2003/0067874 | A1 | 4/2003 | See et al. |
| 2003/0105881 | A1 | 6/2003 | Symons et al. |
| 2003/0142680 | A1 | 7/2003 | Oguchi |
| 2003/0217151 | A1* | 11/2003 | Roese et al. ............... 709/225 |
| 2003/0226017 | A1* | 12/2003 | Palekar et al. ............ 713/168 |
| 2003/0236898 | A1* | 12/2003 | Hu ............... 709/229 |
| 2004/0053601 | A1 | 3/2004 | Frank et al. |
| 2004/0160903 | A1 | 8/2004 | Gai et al. ............... 370/254 |
| 2004/0255154 | A1 | 12/2004 | Kwan et al. |
| 2005/0025125 | A1 | 2/2005 | Kwan |
| 2005/0055570 | A1 | 3/2005 | Kwan et al. |
| 2005/0091313 | A1 | 4/2005 | Zhou et al. |
| 2005/0185626 | A1* | 8/2005 | Meier et al. ............... 370/338 |
| 2007/0220596 | A1* | 9/2007 | Keeler et al. ............... 726/7 |

OTHER PUBLICATIONS

Cisco Systems, Inc., Chapter 20, "Configuring Port-Based Traffic Control", Catalyst 3550 Multilayer Switch Software Configuration Guide, Cisco IOS Release 12.1(13) EA1, Mar. 2003, pp. 1-14.
Cisco Systems, Inc., Chapter 27, "Configuring Network Security with ACLs", Catalyst 3550 Multilayer Switch Software Configuration Guide, Cisco IOS Release 12.1(13) EA1, Mar. 2003, pp. 1-48.
The Institute of Electrical and Electronics Engineers, Inc., "Port-Based Network Access Control", 2001, pp. 1-134.
Cisco Systems, Inc., Ch. 9, "Configuring 802.1X Port-Based Authentication," Catalyst 3550 Multilayer Switch SW Config. Guide, Cisco IOS Rel. 12.3 (13) EA1, Mar. 2003, pp. 1-18.
Cisco Systems, Inc., Ch. 20, "Configuring Port-Based Traffic Control," Catalyst 3550 Multilayer Switch SW Config. Guide, Cisco IOS Rel. 12.3 (13) EA1, Mar. 2003, pp. 1-14.
Cisco Systems, Inc., Ch. 27, "Configuring Network Security with ACLs," Catalyst 3550 Multilayer Switch SW Config. Guide, Cisco IOS Rel. 12.3 (13) EA1, Mar. 2003, pp. 1-48.
Copending U.S. Appl. No. 10/458,628, filed Jun. 11, 2003, entitled: "Multiple Tiered Network Security System, Method and Apparatus".
Most recent Office Action issued by USPTO in copending U.S. Appl. No. 10/458,628 dated Jun. 1, 2007.
Copending U.S. Appl. No. 10/654,417, filed Sep. 4, 2003, entitled: "Multiple Tiered Network Security System, Method and Apparatus Using Dynamic User Policy Assignment".
Most recent Office Action issued by USPTO in copending U.S. Appl. No. 10/654,417 dated Jun. 18, 2007.
Hayes et al., Authenticated VLANs: Secure Network Access at Layer 2, Alcatel Telecommunications Review, pp. 28-286, 2002.
Microsoft, "Recommendations for IEEE 801.11 Access Points," Apr. 2, 2002, pp. 1-12, obtained from http://www.microsoft.com/whdc/device/network/802x/AccessPts.mspx.
Congdon, P. et al., "IEEE 802.1X Remote Authentication Dial in User Service (RADIUS) Usage Guidelines," The Internet Society, 2003, 30 pages, obtained from http://www.faqs.org/ftp/rfc/pdf/rfc3580.txt.pdf.
Office Action issued in USPTO in copending U.S. Appl. No. 10/925,155 dated Apr. 14, 2009.
Office Action issued in USPTO in copending U.S. Appl. No. 10/925,155 dated Oct. 27, 2008.
Office Action issued in USPTO in copending U.S. Appl. No. 10/925,155 dated Mar. 20, 2008.
Office Action issued in USPTO in copending U.S. Appl. No. 10/458,628 dated Aug. 15, 2008.
Office Action issued in USPTO in copending U.S. Appl. No. 10/458,628 dated Feb. 26, 2009.
Office Action issued in USPTO in copending U.S. Appl. No. 10/458,628 dated Oct. 8, 2009.
Office Action issued in USPTO in copending U.S. Appl. No. 10/458,628 dated Nov. 30, 2007.
Office Action issued in USPTO in copending U.S. Appl. No. 10/654,417 dated Dec. 31, 2007.
Office Action issued in USPTO in copending U.S. Appl. No. 10/654,417 dated Jul. 29, 2008.
Office Action issued in USPTO in copending U.S. Appl. No. 10/654,417 dated Sep. 4, 2009.
Office Action issued in USPTO in copending U.S. Appl. No. 10/654,417 dated Dec. 15, 2006.
Office Action issued in USPTO in copending U.S. Appl. No. 10/654,417 dated Jun. 18, 2007.
Office Action issued in USPTO in copending U.S. Appl. No. 10/654,417 dated Feb. 27, 2009.
Office Action issued in USPTO in copending U.S. Appl. No. 10/925,155 dated Jan. 11, 2010.
Michele Wright, "Using Policies for Effective Network Management", International Journal of Network Management, pp. 1-8, John Wiley & Sons, Ltd., 1999.
S. Schmid et al., "An Access Control Architecture for Microcellular Wireless IPv6 Networks," Proceeding of 26th Annual IEEE Conference on Local Computer Networks, 2001, pp. 454-463.

Alcatel Internetworking, Inc., "Authenticated VLANs: Secure Network Access at Layer 2," An Alcatel White Paper, Nov. 2002, pp. 1-14.

http://www.anml.iu.edu/PDF/Automatic_Spoof_Detector.pdf, entitled "Automatic Spoof Detector (aka Spoofwatch)," dated Jan. 28, 2002, printed Jul. 23, 2003, 2 pages in length.

http://www.cert.org/incident_notes/IN-2000-04.html, entitled "CERT® Incident Note IN-2000-04 (Denial of Service Attacks Using Nameservers)," printed Jul. 23, 2003, 3 pages in length.

http://www.cisco.com/en/US/products/hw/switches/ps574/products_configuration_guide_chapter09186a008007ef90.html#x tocid3 (PDF & web pages), entitled "Cisco Catalyst 1900 Series Switches," printed Jul. 29, 2003, 13 pages in length.

http://www.cisco.com/en/US/products/sw/iosswrel/;s1839/products_feature_guide09186a00801543c8.html#1027177 (PDF & web pages), entitled "Cisco IOS Software Releases 12.2T," printed Jul. 29, 2003, 12 pages in length.

http:www.cisco.com/en/US/tech/tk648/tk361/technologies_tech_note09186a0080094adb.shtml (PDF & web pages), entitled "IP Addressing Services," printed Jul. 29, 2003, 10 pages in length.

http://www.cisco.com/en/US/tech/tk86/tk803/technologies_tech_note09186a00800a7828.shtml (PDF & web pages), entitled "Cisco-Cable Source-Verify and IP Address Security," printed Jul. 23, 2003, 25 pages in length.

http://www.extremenetworks.com/libraries/prodpdfs/products/ex_ware_tech_brief.pdf (Extreme Networks PDF), entitled "Tech Brief ExtremeWare 6.2," printed Jul. 29, 2003, 8 pages in length.

http://www.extremenetworks.com/libraries/prodpdfs/products/UnifiedWireless.asp (Extreme Networks PDF & web pages), entitled: Unified Access Architecture for Wired and Wireless Networks, printed Jul. 29, 2003, 10 pages in length.

http://www.legions.org/kv/kv7.txt, entitled "Keen Veracity Legions of the Underground Issue #[7],:" printed Jun. 24, 2003, pp. 1-41.

http://www.linuxgazette.com/issue63/sharma.html, entitled "IP Spoofing," printed Jul. 23, 2003, e pages in length.

http://www.networkcommand.com/docs/ipspoof.txt, entitled "[IP-spoofing Demystified] (Trust-Relationship Exploitation)," Jun. 1996, printed May 18, 2003, pp. 1-9.

http://www.sans.org/rr/threats/spoofed.php (PDF and web pages), entitled Spoofed IP Address Distributed Denial of Service Attacks: Defense-in-Depth, printed Jul. 23, 2003, 7 pages in length.

Office Action dated Nov. 30, 2007 for U.S. Appl. No. 10/458,628.

Office Action dated Dec. 31, 2007 for U.S. Appl. No. 10/654,417.

Office Action issued in U.S. Appl. No. 10/458,628, dated Mar. 24, 2010.

Office Action issued in U.S. Appl. No. 10/654,417, dated Mar. 24, 2010.

Notice of Allowance from U.S. Appl. No. 10/654,417, dated Apr. 22, 2010.

Peter J. Welcher, "Switching: MultiLayer Switching", pp. 1-9, 1999.

Office Action in U.S. Appl. No. 10/458,628, mailed Aug. 2, 2010.

Office Action in U.S. Appl. No. 10/925,155, mailed Oct. 6, 2010.

U.S. Appl. No. 12/769,626, filed Apr. 28, 2010.

U.S. Appl. No. 12/869,602, filed Aug. 26, 2010.

U.S. Appl. No. 10/925,155, filed Aug. 24, 2004.

Office Action in U.S. Appl. No. 10/458,628, mailed Nov. 16, 2010.

Hayes et al., Authenticated VLANs; Secure Network Access at Layer 2, Alcatel Telecommunications Review, pp. 280-286 (2002).

* cited by examiner

SYSTEM, METHOD AND APPARATUS FOR PROVIDING MULTIPLE ACCESS MODES IN A DATA COMMUNICATIONS NETWORK

BACKGROUND OF THE INVENTION

1. Field of the Invention

The present invention is generally directed to data communications networks. In particular, the present invention is directed to providing multiple access modes in a data communications network.

2. Background

There is an increasing demand for flexible security features for controlling access to data communications networks. This is due, in large part, to an increase in the use of a wide variety of portable computing and communication devices such as laptop computers and Voice Over Internet Protocol (VOIP) telephones. These devices, which often use different protocols for access and security, can be easily moved from one network access point to another, or from one network to another network. While such mobility and ease of access may be desirable from an end user perspective, it creates significant concerns from the perspective of network access and security.

For wired networks, recent security solutions from network vendors have involved pushing authentication and access functions out to the layer 2 port, such as to a layer 2 switch. Typical solutions involve user authentication at the layer 2 switch in accordance with protocols defined by, for example, the IEEE 802.1x standard. However, at present, only a small percentage of portable computing devices provide 802.1x support (i.e., have embedded 802.1x client software). When a user device does not support the user authentication protocol, conventional layer 2 switches drop the offending device, and deny access to the network. In other words, conventional switches employ a binary protocol as a first step, wherein access depends on whether the user device supports a particular user authentication protocol, such as a user authentication protocol in accordance with the IEEE 802.1x standard.

This conventional method of authentication and access limits the flexibility of conventional layer 2 switches. For example, in a common enterprise scenario, a visitor to an organization attends a meeting in a conference room that is fully wired for access to the organization's local area network (LAN). A sophisticated user authentication protocol, such as a user authentication protocol in accordance with the IEEE 802.1x standard, allows authorized users access to one or more virtual local area networks (VLANs). However, if the visitor's laptop computer does not support the user authentication protocol, then conventional layer 2 switches will deny all access to the organization's LAN. As a result, the visitor would not be able to perform such basic functions as checking e-mail on the Internet, placing or receiving a VoIP telephone call, or availing herself of other online functions that would not otherwise compromise organizational security.

What is needed then is an access solution that improves upon and addresses the shortcomings of known access and authentication solutions.

BRIEF SUMMARY OF THE INVENTION

The present invention is directed to a network access system, method and apparatus that substantially obviates one or more of the problems and disadvantages of the related art.

In particular, the present invention is directed to a network access device, such as a network switch, that provides at least one additional access mode for user devices that do not support a user authentication protocol used by a host network. For example, an embodiment of the present invention grants limited access to a user device even if the user device does not support a user authentication protocol recognized by the host network, such as a protocol in accordance with the IEEE 802.1x standard. Such flexibility allows a visitor to an organization access to a pre-configured low-security VLAN, or one of a plurality of pre-configured low-security VLANs depending on the type of user device, even if the user device does not support the authentication protocol used by the host network.

The present invention is an advance over conventional network switches that implement the 802.1x user authentication protocol. Such conventional switches place a user device in either one of two states: an authorized state, in which full network access is permitted, or an unauthorized state, in which network access is denied and the only packets that may be received from the user device are 802.1x control packets. Thus, a user device that does not include an 802.1x client will be denied all network access by such switches. An embodiment of the present invention addresses this problem by providing at least a third authorization state, which may be thought of as "semi-authorized," in which some form of limited network access is allowed.

In accordance with one embodiment of the present invention, a method for providing multiple access modes in a data communications network is disclosed. The method includes sensing a user device coupled to a port of a network access device, determining if the user device supports a user authentication protocol used by a host network, and placing the port into a semi-authorized access state if it is determined that the user device does not support the user authentication protocol. The semi-authorized access state then limits access by the user device to a pre-configured network accessible via the data communications network.

In an alternate embodiment of the present invention, a network access device for providing multiple access modes is provided. The network access device comprises a plurality of input ports, a plurality of output ports, a switching fabric for routing data received on the plurality of input ports to at least one of the plurality of output ports, and control logic. The control logic is adapted to determine whether a user device coupled to one of the plurality of input ports supports an authentication protocol used by a host network, and to place the input port into a semi-authorized access state if the authentication protocol is not supported, thereby providing the user device with limited access to a pre-configured network accessible via the host network.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Overview

The present invention is directed to a system, method and apparatus for providing multiple access modes in a data communications network. The system, method and apparatus provides at least three levels of network access. The particular level of access depends on whether a user device is configured to support an authentication protocol used by the host network. In conventional network access devices, the inability to communicate with the host network using a particular user authentication protocol, such as the IEEE 802.1x protocol, results in a denial of access to subsequent levels of authentication, and termination of the network connection.

In an embodiment of the present invention, a network access device is configured to provide one or more default access modes. A user device coupled to a port of the network access device can be automatically limited to one of the one or more pre-configured access modes if the user device does not support an authentication protocol used by the host network. The pre-configured access mode may limit access to, for example, a Voice over Internet Protocol (VoIP) network, the Internet, or a pre-configured virtual local area network (VLAN).

Figure 1:
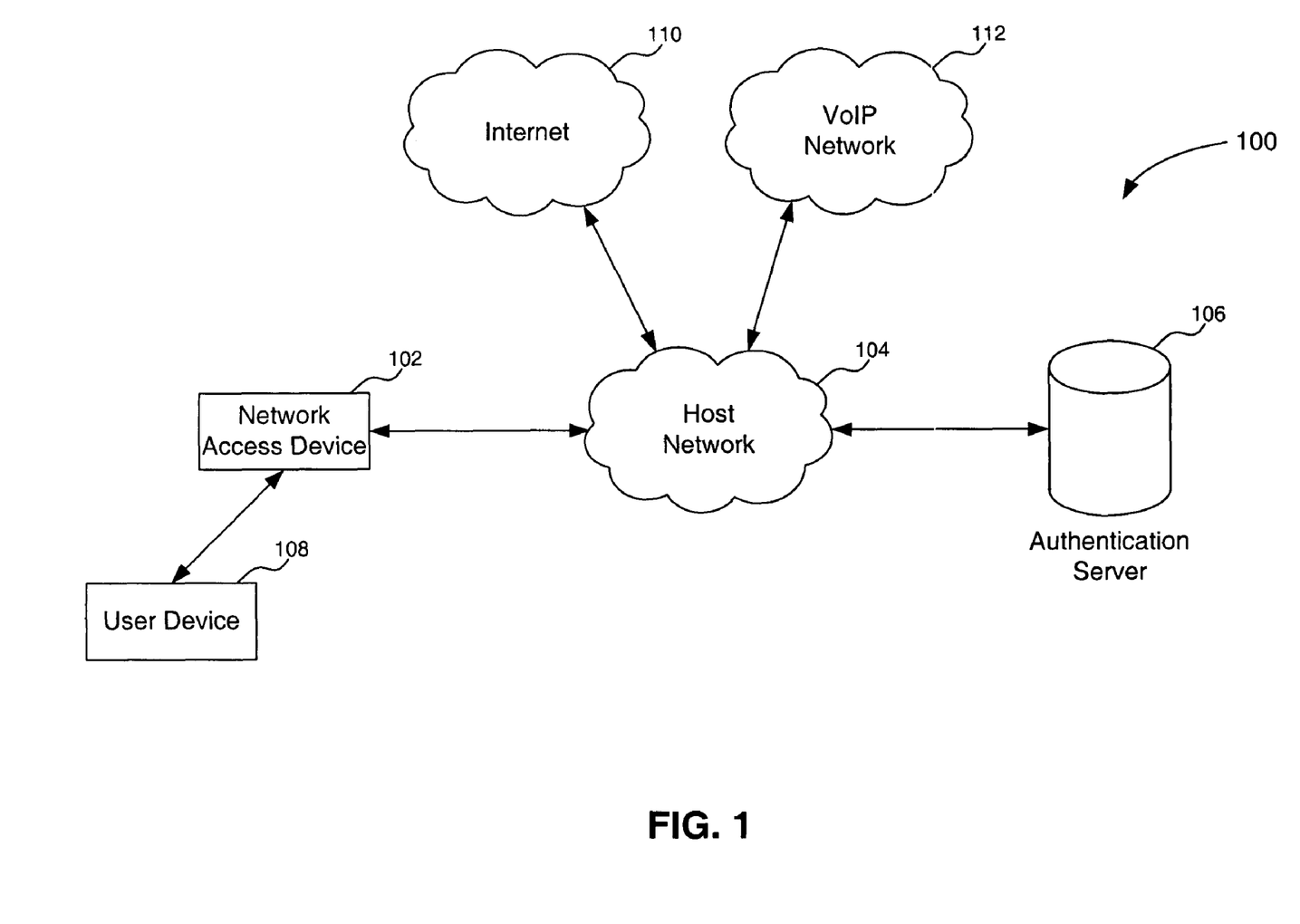
FIG. 1 depicts the basic elements of a data communications network that provides multiple network access modes in accordance with an embodiment of the present invention.

B. System, Method and Apparatus for Providing Multiple Access Modes in Accordance with an Embodiment of the Present Invention FIG. 1 depicts the basic elements of data communications network 100 that provides multiple network access modes in accordance with an embodiment of the present invention. As shown in FIG. 1, data communications network 100 comprises a host network 104, a network access device 102 and an authentication server 106 each of which is communicatively coupled to host network 104, and a user device 108 that is communicatively coupled to network access device 102.

Host network 104 comprises a plurality of network nodes interconnected via a wired and/or wireless medium, wherein each node consists of a device capable of transmitting or receiving data over host network 104. In the embodiment described herein, host network 104 comprises a conventional local area network (LAN) that employs an Ethernet communication protocol in accordance with the IEEE 802.3 standard for data link and physical layer functions. However, the invention is not so limited, and host network 104 may comprise other types of networks, including but not limited to a wide area network (WAN), and may employ other types of communication protocols, including but not limited to ATM, token ring, ARCNET, or FDDI (Fiber Distributed Data Interface) protocols.

As shown in FIG. 1, host network 104 is communicatively coupled to a plurality of external networks, or "extranets," including the Internet 110 and a Voice over Internet Protocol (VoIP) network 112. As will be appreciated by persons skilled in the relevant art(s), access to the extranets is facilitated by one or more network gateway devices, which comprise part of host network 104.

Network access device 102, which preferably comprises a network switch, is a device that comprises a plurality of ports for communicatively interconnecting network devices to each other and to host network 104. Network access device 102 is configured to channel data units, such as data packets or frames, between any two devices that are attached to it up to its maximum number of ports. In terms of the International Standards Organization's Open Systems Interconnection (OSI) model, network access device 102 performs layer 2, or data link layer, functions. In particular, network access device 102 examines each received data unit and, based on a destination address included therein, determines which network device the data unit is intended for and switches it out toward that device. In the embodiment described herein, the destination address comprises a physical or Media Access Control (MAC) address of a destination device.

Figure 2:
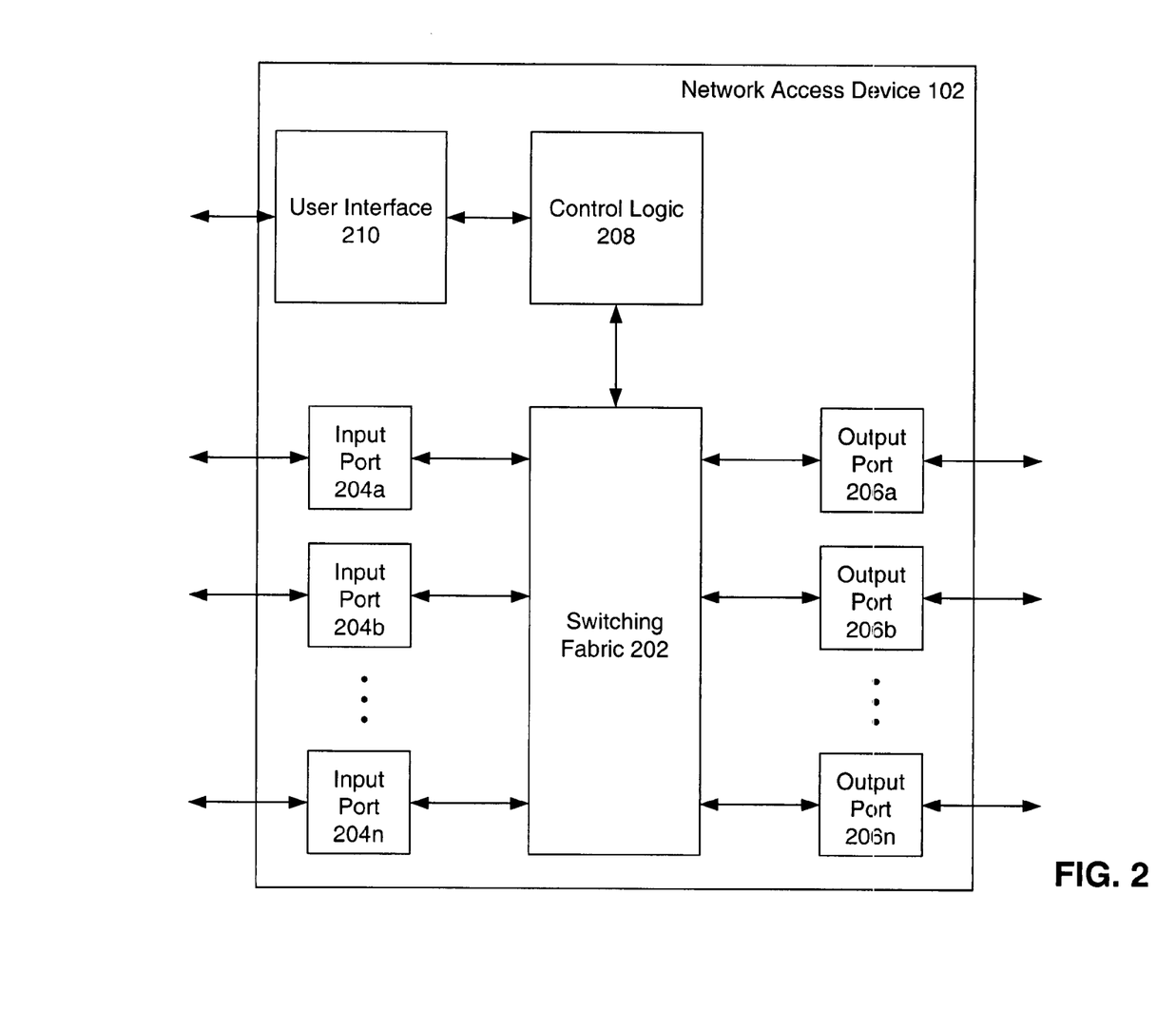
FIG. 2 depicts an exemplary high-level architecture of a network access device, such as a network switch, in accordance with an embodiment of the present invention.

FIG. 2 depicts an exemplary high-level architecture of network access device 102 in accordance with an embodiment of the present invention. As shown in FIG. 2, network access device 102 comprises a plurality of input ports, 204a through 204n, that are coupled to a plurality of output ports, 206a through 206n, via a switching fabric 202. The designation of ports as either input ports or output ports is arbitrary as one skilled in the art would recognize that ports facilitate data transmission in either direction. Network access device 102 also includes control logic 208 for controlling various aspects of network access device operation and a user interface 210 to facilitate communication with control logic 208. User interface 210 provides a means for a user, such as a system administrator, to reconfigure network access device 102 and adjust operating parameters.

In operation, data units (e.g, packets or frames) are received and optionally buffered on one or more of input ports 204a through 204n. Control logic 208 schedules the serving of data units received by input ports 204a through 204n in accordance with a predetermined scheduling algorithm. Data units are then served to switching fabric 202, which routes them to the appropriate output port 206a through 206n based on, for example, the destination address of the data unit.

Output ports 206a through 206n receive and optionally buffer data units from switching fabric 202, and then transmit them on to a destination device. In accordance with an embodiment of the present invention, network access device 102 may also include logic for performing routing functions (layer 3 or network layer functions in OSI).

With further reference to FIG. 1, user device 108 is shown connected to one of the ports of network access device 102. User device 108 may comprise a personal computer (PC), laptop computer, Voice Over Internet Protocol (VoIP) phone, or any other device capable of transmitting or receiving data over a data communications network, such as network 100.

Authentication server 106 comprises a computer that stores application software and a database of profile information for performing a user authentication protocol that will be described in more detail herein. In an embodiment, authentication server 106 comprises a server that uses the Remote Authentication Dial-In User Service (RADIUS) as set forth in Internet Engineering Task Force (IETF) Request For Comments (RFC) 2865 for performing user authentication functions.

Figure 3:
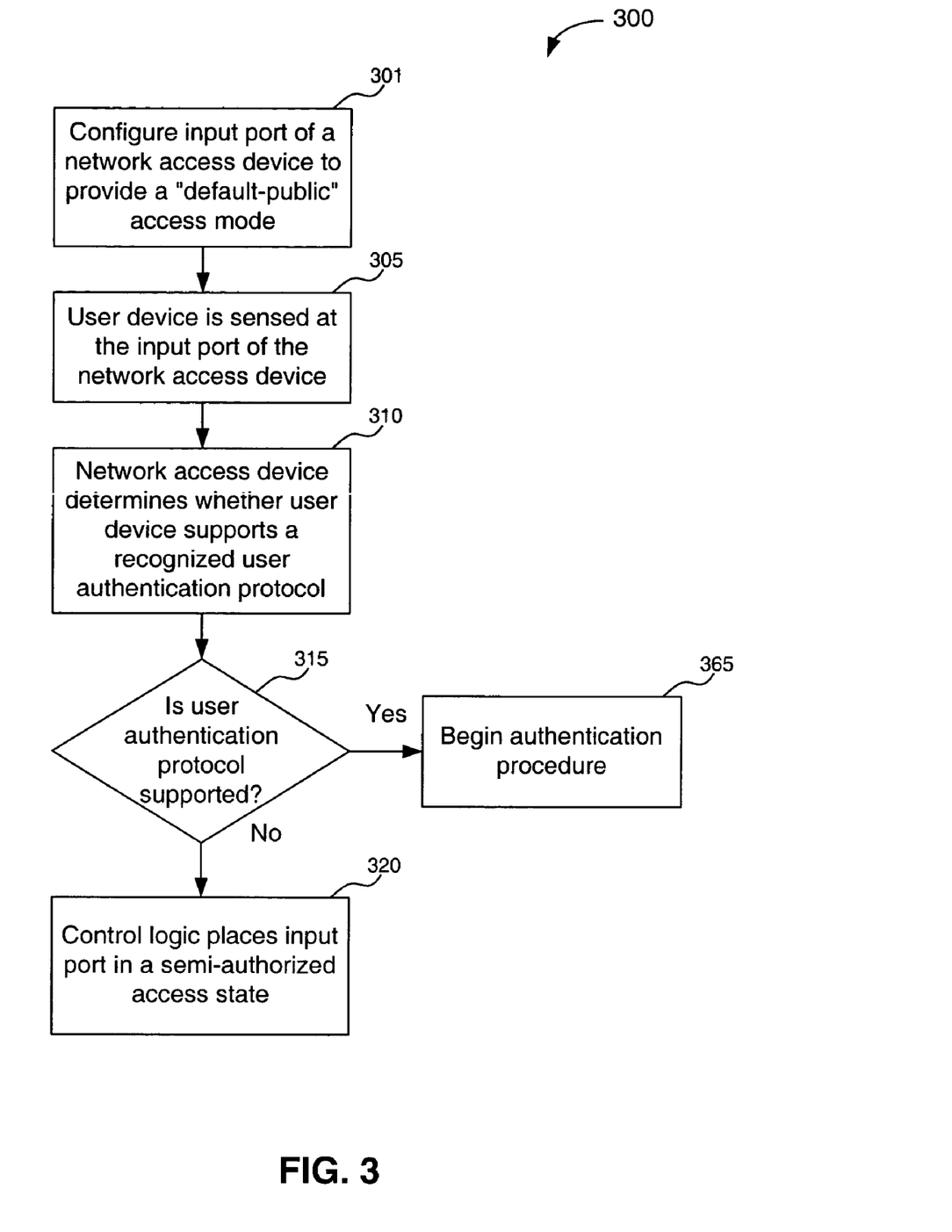
FIG. 3 is a flowchart of a method for providing multiple access modes in a data communications network in accordance with an embodiment of the present invention.

FIG. 3 illustrates a flowchart 300 of a method for providing multiple access modes in a data communications network in accordance with an embodiment of the present invention. The invention, however, is not limited to the description provided by the flowchart 300. Rather, it will be apparent to persons skilled in the relevant art(s) from the teachings provided herein that other functional flows are within the scope and spirit of the present invention. Flowchart 300 will be described with continued reference to data communications network 100 and network access device 102 described above in reference to FIGS. 1 and 2. The invention, however, is not limited to those embodiments.

The method of flowchart 300 begins at step 301, in which one of the input ports 204a-204n (referred to hereinafter as input port 204) is configured to provide a default-public access mode for devices that do not support a user authentication protocol used by host network 104. In an embodiment, the default-public access mode is a semi-authorized access state that limits network access to Internet 110, VoIP network 112, or another low-security VLAN that is outside the organization's secure LAN. The specific type of semi-authorized access state provided to a user device 108 not supporting the user authentication protocol used by host network 104 can be configured by a network administrator via user interface 210.

In step 305, user device 108 is sensed at input port 204 of network access device 102. Control logic 208 senses user device 108 when it is coupled to input port 204. Coupling user device 108 to input port 204 may comprise, for example, coupling user device 108 to an RJ-45 connector, which is in turn wired to input port 204.

At step 310, network access device 102 determines whether user device 108 supports a user authentication protocol used by host network 104. To accomplish this, control logic 208 polls user device 108 for a user authentication protocol. In an embodiment, the user authentication protocol is IEEE 802.1x.

At step 315, control logic 208 performs one of two actions. If user device 108 does not support the user authentication protocol, control logic 208 places network access device port 204 in a semi-authorized access state, as shown at step 320. If user device 108 does support the user authentication protocol, control logic 208 begins further authentication in accordance with the user authentication protocol, as shown at step 365.

Where the user authentication protocol is IEEE 802.1x, these steps are carried out as will now be described. Network access device 102 forces the user's client software into an unauthorized state that allows the client to send only an extensible authentication protocol (EAP) start message. If user device 108 supports IEEE 802.1x, then step 365 is invoked, and the authentication procedure begins in accordance with IEEE 802.1x. Accordingly, network access device 102 transmits an EAP message requesting the user's identity (e.g., a user name and password). The client returns the identity, which is then forwarded by network access device 102 to authentication server 106, which uses an algorithm to authenticate the user and then returns an accept or reject message back to network access device 102. Assuming an accept message was received, network access device 102 changes the client's state to authorized and normal communication can take place.

If user device 108 does not support IEEE 802.1x, as evidenced by lack of authentication attempts after N seconds, step 320 is invoked. In step 320, control logic 208 places input port 204 into a semi-authorized access state. As described above, in this embodiment, the semi-authorized access state causes the port to restrict access to Internet 110, VoIP network 112, or another low-security VLAN defined by the network administrator that is outside the organization's secure LAN.

In an alternative embodiment, not shown in FIG. 3, port 204 is configured to additionally provide a default-secure access mode. In a default-secure access mode, if user device 108 does not support a user authentication protocol used by host network 104, then the entire port 204 is blocked and secured. This option is available for installations that do not desire to provide guests access to the Internet or other semi-authorized networks.

Figure 4:
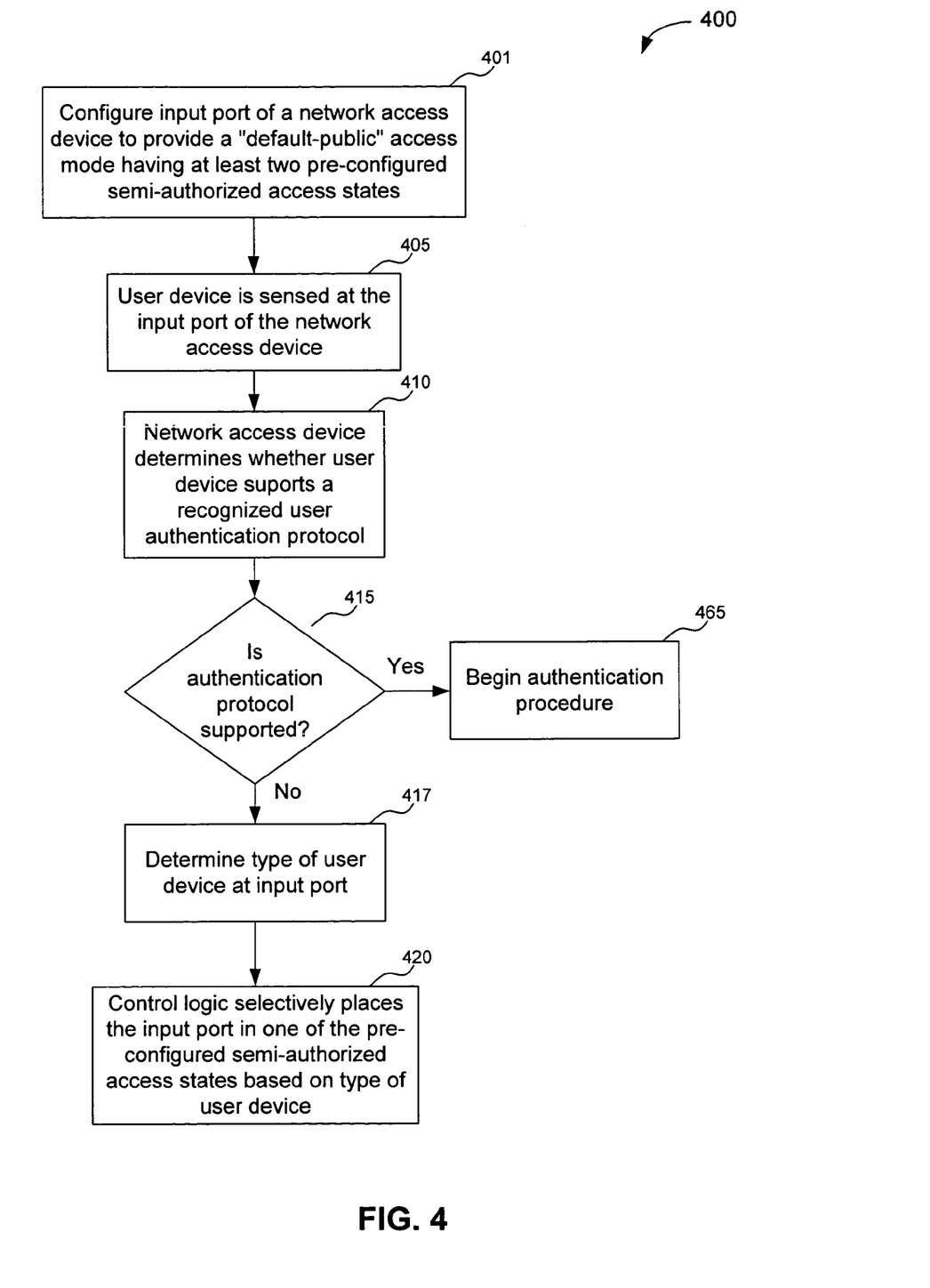
FIG. 4 is a flowchart of an alternate method for providing multiple access modes in a data communications network in accordance with an embodiment of the present invention.

C. System, Method and Apparatus for Providing Multiple Access Modes Based on User Device Type in Accordance with an Embodiment of the Present Invention FIG. 4 illustrates a flowchart 400 of an alternate method for providing multiple access modes in a data communications network in accordance with an embodiment of the present invention. In particular, flowchart 400 describes an embodiment of the present invention wherein the default-public access mode comprises a plurality of pre-configured semi-authorized access states. Each of these states provide limited network access to a corresponding one of a plurality of low security VLANs as configured by a network administrator. If user device 108 does not support a user authentication protocol used by host network 104, the input port to which user device 108 is coupled is selectively placed into one of the plurality of pre-configured semi-authorized access states depending on the type of user device 108 (e.g., VoIP telephone or portable computing device). The invention, however, is not limited to the description provided by flowchart 400. Rather, it will be apparent to persons skilled in the relevant art(s) from the teachings provided herein that other functional flows are within the scope and spirit of the present invention. Flowchart 400 will also be described with continued reference to data communications network 100 and network access device 102 described above in reference to FIGS. 1 and 2. The invention, however, is not limited to those embodiments.

The method of flowchart 400 begins at step 401, in which one of input ports 204a-204n of network access device 102 (referred to hereinafter as input port 204) is configured to provide a default-public access mode. In this embodiment, the default-public access mode comprises at least two semi-authorized access states. This is in contrast to step 301 of FIG. 3, in which the default-public access mode comprises only one semi-authorized access state. For example, in the present embodiment, input port 204a can be configured to allow network access only to the Internet or a VoIP network depending on the type of user device coupled to the port. Similarly, a second input port 204*b* can be configured to allow network access only to the Internet, a VoIP network, or some other low security VLAN depending on the type of user device coupled to the port. One skilled in the art can envision various desirable combinations based on, for example, the location of the input port.

In step 405, user device 108 is sensed at input port 204 of network access device 102 in a manner similar to that described above in reference to step 305 of flowchart 300. Control logic 208 senses user device 108 when it is coupled to input port 204. Coupling user device 108 to input port 204 may comprise, for example, coupling user device 108 to an RJ-45 connector, which is in turn wired to input port 204.

In step 410, network access device 102 determines whether user device 108 supports a user authentication protocol used by host network 104 in a manner similar to that described above in reference to step 310 of flowchart 300. To accomplish this, control logic 208 polls user device 108 for a user authentication protocol. In an embodiment, the authentication protocol is IEEE 802.1x.

In step 415, control logic 208 performs one of two actions. If user device 108 does not support the user authentication protocol, the method proceeds to determining the type of user device that has been sensed at input port 204, as shown in step 417. To determine the type of user device 108, user device 108 is polled by control logic 208 A variety of known techniques for distinguishing between various types of user devices are readily available to persons skilled in the relevant art(s). As shown at step 420, control logic 208 then selectively places input port 204 into one of the at least two semi-authorized access states configured in step 401 based on the type of user device. For instance, if user device 108 is a VoIP telephone, then input port 204 will default to a semi-authorized state that includes a VoIP network, and thus provide user device 108 with restricted access to VoIP network 112. Likewise, if user device 108 is a laptop computer, then input port 204 will default to a semi-authorized state that includes the Internet, and thus provide user device 108 with restricted access to the Internet 110. These examples are not meant to be limiting. One skilled in the art can envision a variety of pre-configured low security networks to which a user device 108 can be provided access based on device type in accordance with this embodiment of the present invention.

If user device 108 does support the user authentication protocol, control logic 208 begins further authentication in accordance with the user authentication protocol, as shown at step 465.

Figure 5A:
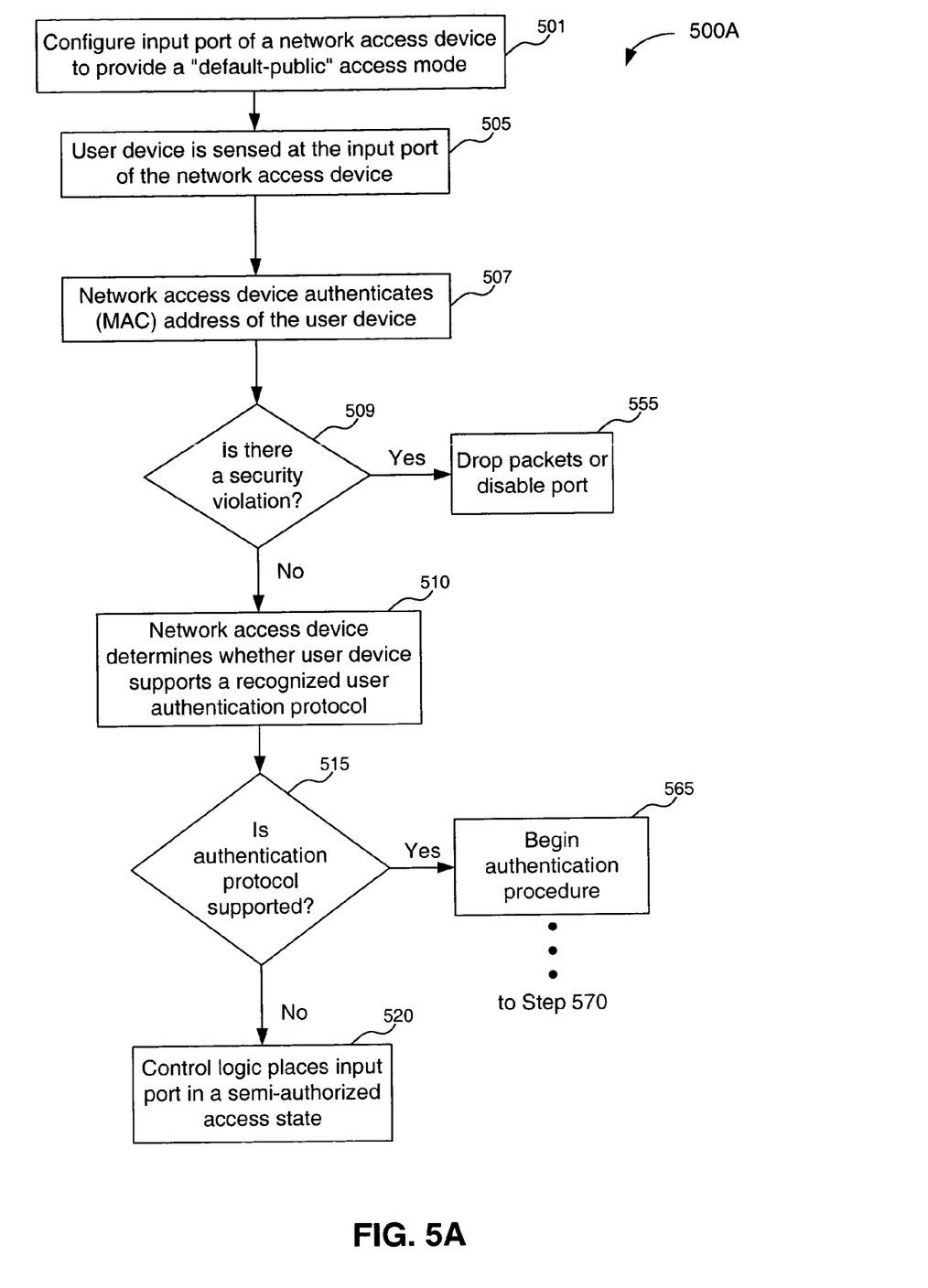
FIGS. 5A and 5B depict a flowchart of a method for providing additional levels of security in a data communications network that provides multiple access modes in accordance with an embodiment of the present invention.
Figure 5B:
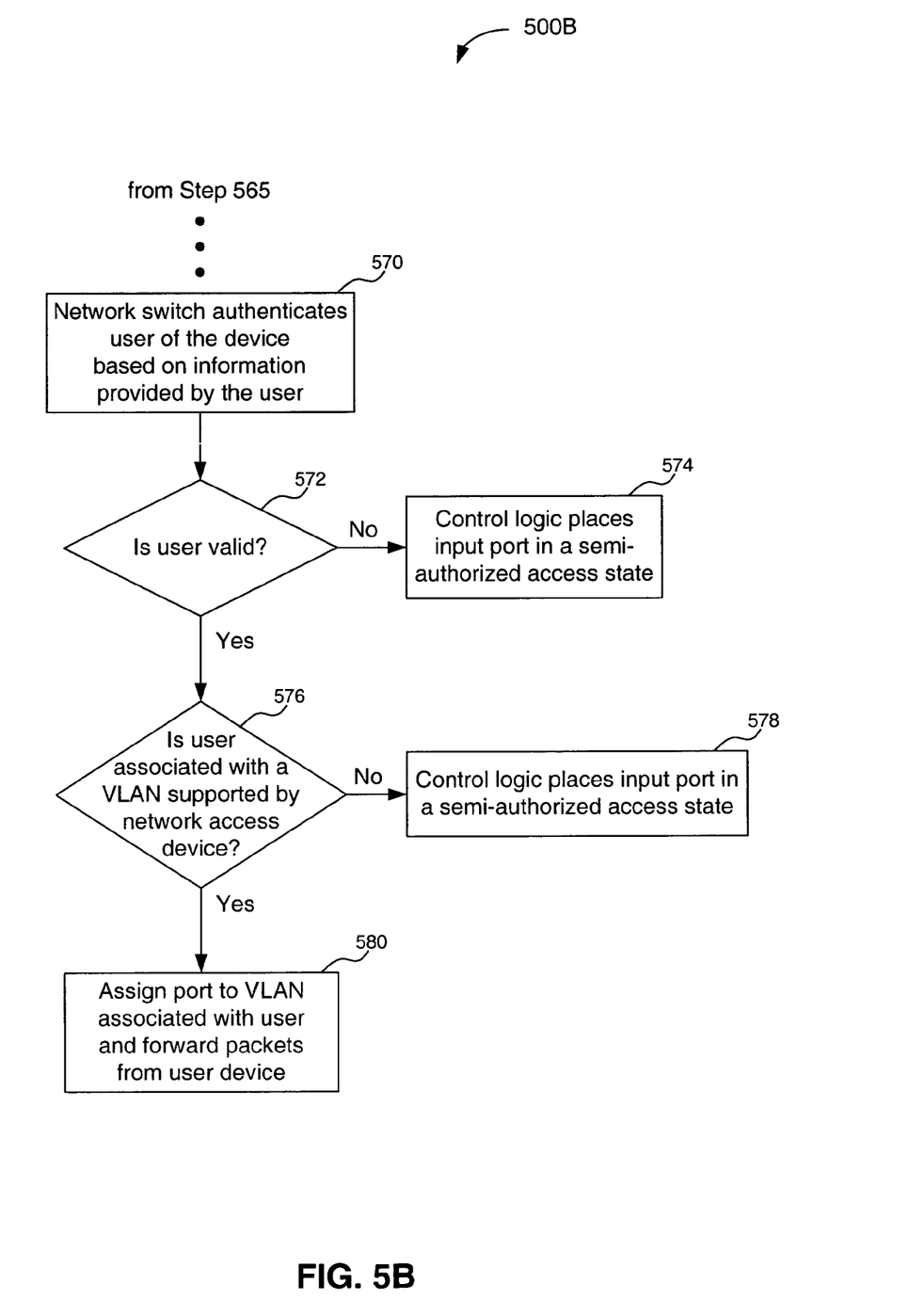

D. Method for Providing Additional Levels of Security in a Data Communications Network that Provides Multiple Access Modes in Accordance with an Embodiment of the Present Invention FIGS. 5A and 5B depict flowcharts 500A and 500B of a method for providing additional levels of security in a data communications network that provides multiple access modes in accordance with the present invention. The additional levels of security may comprise validation of a media access control (MAC) address, or physical address, of a user device coupled to a port of a network access device, as well as dynamic VLAN assignment of the user device. The invention, however, is not limited to the description provided by flowcharts 500A and 500B. Rather, it will be apparent to persons skilled in the relevant art(s) from the teachings provided herein that other functional flows are within the scope and spirit of the present invention. Flowcharts 500A and 500B will also be described with continued reference to data communications network 100 and network access device 102 described above in reference to FIGS. 1 and 2. The invention, however, is not limited to those embodiments.

The method of flowcharts 500A and 500B begins at step 501 in which one of input ports 204*a*-204*n* of network access device 102 (referred to hereinafter as input port 204) is configured to provide a default-public access mode. This step is further described above in relation to step 301 of flowchart 300.

At step 505, a user device 108 is sensed at input port 204 of network access device 102, as further described above in reference to step 305 of flowchart 300. At step 507, network access device 102 authenticates a physical (MAC) address of user device 108. Network access device 102 performs this step by comparing a MAC address of user device 108 with a limited number of "secure" MAC addresses that are stored by network access device 102.

As shown at step 509, if packets received from user device 108 have a source MAC address that does not match any of the secure addresses, then there is a security violation and the protocol proceeds to step 555, in which network access device 102 either drops the packets or alternately, disables input port 204 entirely. Thus, a first additional layer of security is provided in which a physical (MAC) address is validated before user device 108 is allowed any access to host network 104. This feature is described in more detail in Section E, below.

However, as also shown at step 509, if packets received from user device 108 have a source MAC address that does match one of the secure addresses, then no security violation has occurred, and the protocol proceeds to step 510, in which network access device 102 determines whether user device 108 supports a user authentication protocol used by host network 104. This step is more fully described above in reference to step 310 of flowchart 300.

At step 515, control logic 208 performs one of two actions in a manner similar to that described above in reference to step 315 of flowchart 300. If user device 108 does not support the user authentication protocol, control logic 208 places network access device port 204 in a semi-authorized access state, as shown at step 520. If user device 108 does support the user authentication protocol, control logic 208 begins further authentication in accordance with the user authentication protocol, as shown at step 565.

FIG. 5B depicts a continuation of the authentication procedure that was begun in step 565 of FIG. 5A, and provides an additional level of security for user devices 108 that do support a recognizable authentication protocol. This additional level of security may be referred to as dynamic VLAN assignment. In an embodiment in which the user authentication protocol is IEEE 802.1x, dynamic VLAN provisioning is carried out as will now be described.

At step 570, network access device 102 authenticates a user of user device 108 based upon credentials provided by the user. In accordance with 802.1x, this entails sending the user credentials in a request message to authentication server 106 and receiving an accept or reject message in return, the accept or reject message indicating whether the user is valid. As shown at step 572, if the user is not valid, then the security protocol proceeds to step 574, in which control logic 208 places input port 204 in a semi-authorized state. However, as also shown at step 572, if the user is valid, then the security protocol proceeds to step 576.

At step 576, network access device 102 determines whether or not the user is associated with a VLAN supported by network access device 102. In an embodiment, this step entails determining whether a VLAN identifier (ID) or a VLAN Name was returned as part of the accept message from authentication server 106. If the user is not associated with a VLAN supported by network access device 102, control logic 208 places input port 204 in a semi-authorized state. If, however, the user is associated with a VLAN supported by network access device 102, then network access device 102 assigns the port to the specified VLAN and begins processing packets from user device 108, as shown at step 580.

With reference to the exemplary switch embodiment of FIG. 2, the access functions performed by network access device 102, as described above, are performed by control logic 208. As will be appreciated by persons skilled in the art, such functions may be implemented in hardware, software or a combination thereof.

Further details regarding the performance of physical (MAC) address device validation and dynamic VLAN assignment in a network access device are provided in commonly-owned, co-pending U.S. patent application Ser. No. 10/458,628, entitled "Multiple Tiered Network Security System, Method and Apparatus" to Kwan et al., filed Jun. 11, 2003, the entirety of which is incorporated by reference as if set forth fully herein.

E. Physical Address Authentication of User Device in Accordance with an Embodiment of the Present Invention As discussed above, in accordance with an embodiment of the present invention, network access device 102 is adapted to perform a physical (MAC) address authentication of a user device that is coupled to one of its ports. In particular, network access device 102 is adapted to store a limited number of "secure" MAC addresses for each port. A port will forward only packets with source MAC addresses that match its secure addresses. In an embodiment, the secure MAC addresses are specified manually by a system administrator via user interface 210. In an alternate embodiment, network access device 102 learns the secure MAC addresses automatically. If a port receives a packet having a source MAC address that is different from any of the secure learned addresses, a security violation occurs.

With reference to the embodiment of network access device 102 depicted in FIG. 2, secure addresses for each input port 204a through 204n are stored in a local memory assigned to each port. Alternately, secure addresses are stored in a shared global memory, or in a combination of local and global memory (not shown).

In an embodiment, when a security violation occurs, network access device 102 generates an entry to a system log and an SNMP (Simple Network Management Protocol) trap. In addition, network access device 102 takes one of two actions as configured by a system administrator: it either drops packets from the violating address or disables the port altogether for a specified amount of time.

In a further embodiment of the present invention, a system administrator can configure network access device 102 to re-direct packets received from the violating address to a different network destination than that originally intended. Network access device 102 may achieve this by altering the packet headers. For example, network access device 102 may alter a destination address of the packet headers. Alternately, the re-direction may be achieved by generating new packets with identical data payloads but having different packet headers. As will be appreciated by persons skilled in the relevant art(s), the decision to configure network access device 102 to re-direct traffic from a violating address may be premised on the resulting burden to network access device 102 in handling traffic.

Figure 6:
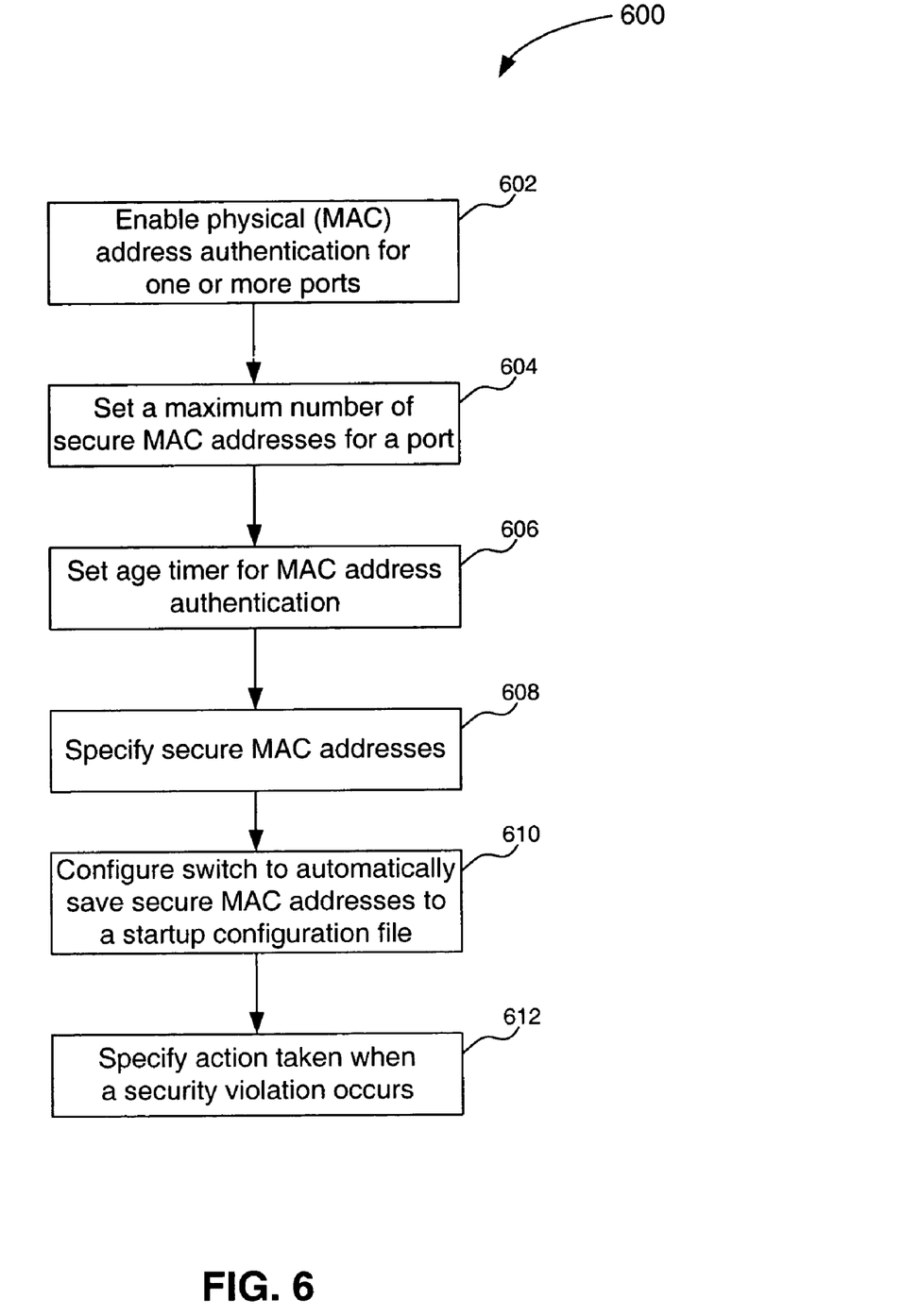
FIG. 6 is a flowchart of a method for enabling physical address authentication as described in reference to FIG. 5A.

FIG. 6 illustrates a flowchart 600 of a method for enabling physical address authentication of a device coupled to a data communications network in accordance with an embodiment of the present invention. In particular, flowchart 600 represents steps performed by a system administrator in order to configure a network access device to perform physical address authentication as described above in reference to step 507 of FIG. 5A. The invention, however, is not limited to the description provided by the flowchart 600. Rather, it will be apparent to persons skilled in the relevant art(s) from the teachings provided herein that other functional flows are within the scope and spirit of the present invention.

At step 602, the system administrator enables the MAC address authentication feature for one or more ports of the network access device. In an embodiment, the security feature is disabled on all ports by default, and a system administrator can enable or disable the feature globally on all ports at once or on individual ports.

At step 604, the system administrator sets a maximum number of secure MAC addresses for a port. In an embodiment, the network access device utilizes a concept of local and global "resources" to determine how many MAC addresses can be secured on each port. In this context, "resource" refers to the ability to store one secure MAC address entry. For example, each interface may be allocated 64 local resources and additional global resources may be shared among all the interfaces on the network access device.

In an embodiment, when the MAC address authentication feature is enabled for a port, the port can store one secure MAC address by default. A system administrator can then increase the number of MAC addresses that can be secured to a maximum of 64, plus the total number of global resources available. The number of addresses can be set to a number from 0 to (64+the total number of global resources available). For example, the total number of global resources may be 2048 or 4096, depending on the size of the memory allocated. When a port has secured enough MAC addresses to reach its limit for local resources, it can secure additional MAC addresses by using global resources. Global resources are shared among all the ports on a first come, first-served basis.

At step 606, the system administrator sets an age timer for the MAC address authentication feature. In an embodiment, secure MAC addresses are not flushed when a port is disabled and brought up again. Rather, based on how the network access device is configured by the system administrator, the secure addresses can be kept secure permanently, or can be configured to age out, at which time they are no longer secure. For example, in an embodiment, the stored MAC addresses stay secure indefinitely by default, and the system administrator can optionally configure the device to age out secure MAC addresses after a specified amount of time.

At step 608, the system administrator specifies secure MAC addresses for a port. Alternately, the network access device can be configured to automatically "learn" secure MAC addresses by storing the MAC addresses of devices coupled to the port up to the maximum number of secure addresses for the port. These stored MAC addresses are then used as the secure addresses for authentication purposes.

At step 610, the system administrator optionally configures the switch to automatically save the list of secure MAC addresses to a startup-configuration ("startup-config") file at specified intervals, thus allowing addresses to be kept secure across system restarts. For example, learned secure MAC addresses can be automatically saved every twenty minutes. The startup-config file is stored in network access device memory (not shown). In an embodiment, by default, secure MAC addresses are not automatically saved to a startup-config file.

At step 612, the system administrator specifies the action taken when a security violation occurs. In the case where the system administrator has specified the secure MAC addresses for the port, a security violation occurs when the port receives a packet with a source MAC address that is different than any of the secure MAC addresses. In the case where the port is configured to "learn" secure MAC addresses, a security violation occurs when the maximum number of secure MAC addresses has already been reached, and the port receives a packet with a source MAC address that is different than any of the secure MAC addresses. In an embodiment, the system administrator configures the network access device to take one of two actions when a security violation occurs: either drop packets from the violating address or disable the port altogether for a specified amount of time. This is illustrated in step 555 of flowchart 500 depicted in FIG. 5.

Figure 7:
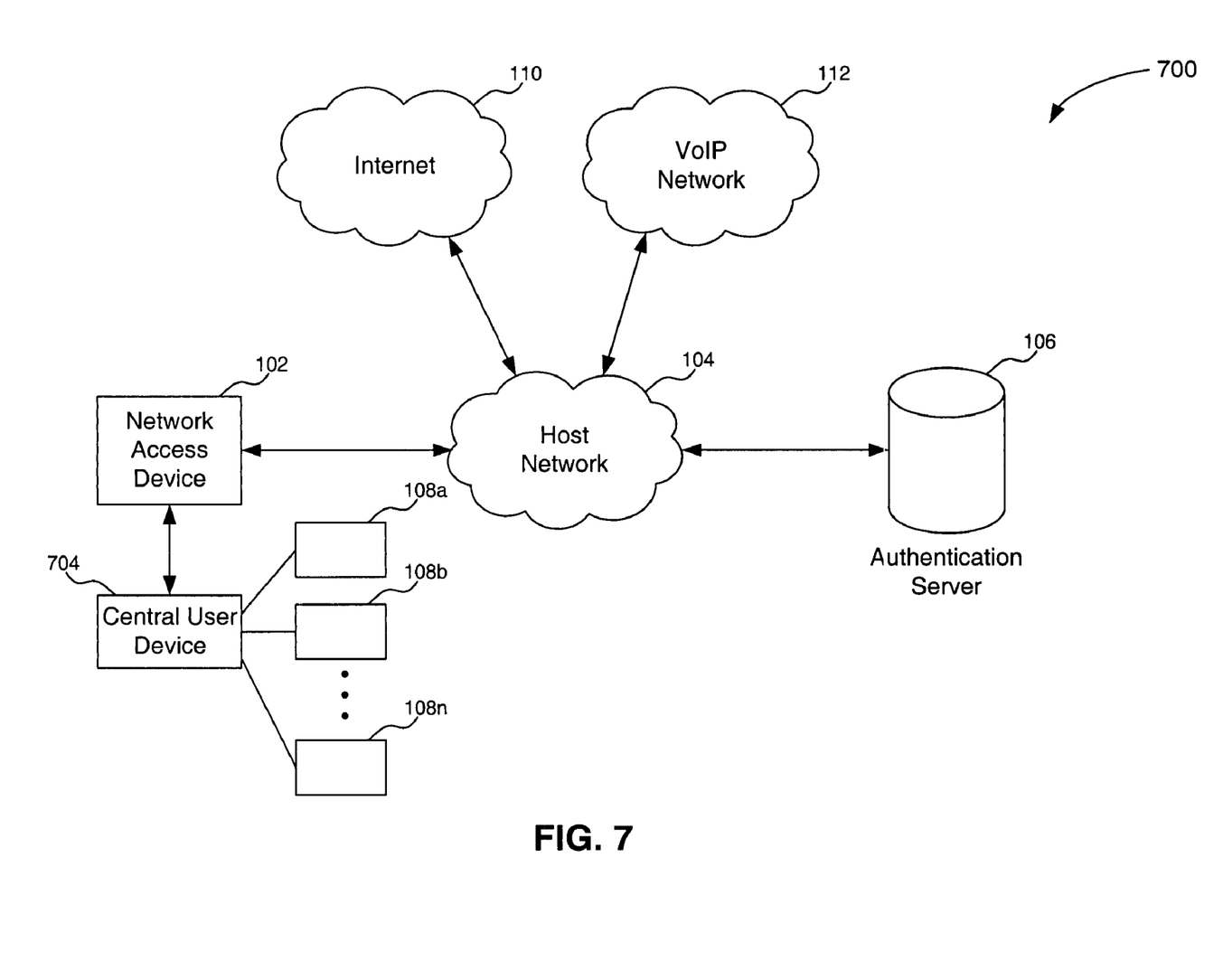
FIG. 7 depicts a data communications network that provides multiple access modes and accommodates a plurality of user devices in a multi-host configuration in accordance with an embodiment of the present invention.

F. Multiple Access Mode System, Method and Apparatus for Multi-Host Environments in Accordance with an Embodiment of the Present Invention The multiple access mode protocols and methods described above may be advantageously implemented in both single host and multiple host (multi-host) environments. FIG. 1 depicts a single host environment, as only a single user device 108 is coupled to a port of network access device 102. FIG. 7 depicts an alternate embodiment of the present invention that accommodates a plurality of user devices 108a-108n in a multi-host configuration. In particular, system 700 of FIG. 7 comprises a host network 104, which is communicatively coupled to a network access device 102, and an authentication server 106. A central user device 704 is coupled to network access device 102 and a plurality of additional user devices 108a through 108n are coupled to network access device 102 via central user device 704 in a multi-host configuration.

The multiple access mode methods described above may be advantageously implemented in system 700 in a variety of ways. For example, network access device 102 may perform physical (MAC) address authentication of central user device 704 only, and then authenticate the users of all the user devices if it determines that central user device 704 has a valid MAC address. If central user device 704 has an invalid MAC address, then the port may be closed to all user devices. Alternately, network access device 102 may perform physical (MAC) address validation of each of the user devices prior to authenticating their users. In this case, network access device 102 can selectively accept packets from user devices having valid MAC addresses while dropping packets from user devices having invalid MAC addresses.

In a similar fashion, network access device 102 can also selectively place user devices that do not support an authentication protocol used by the host network 104 in a semi-authorized access state as described above.

G. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer implemented method comprising:
   at a network access device communicably coupled to a host network, sensing a user device coupled to a port of the network access device;
   determining, by the network access device, if the user device supports a user authentication protocol used by the host network, the determining comprising polling the user device for the user authentication protocol, the user authentication protocol comprising a protocol to validate the identity of a user of the user device; and
   placing, by the network access device, the port into a semi-authorized access state if the determining indicates that the user device does not support the user authentication protocol, the semi-authorized access state providing the user device with limited network access.

2. The method of claim 1, wherein the semi-authorized state limits access by the user device to a network, the network selected from the group comprising a Voice over Internet Protocol (VoIP) network, the Internet, and a low security virtual local area network (VLAN).

3. The method of claim 1, wherein the placing comprises selectively placing the port into one of a plurality of semi-authorized access states.

4. The method of claim 3, wherein the placing comprises:
   determining a type of the user device; and
   selectively placing the port into one of a plurality of semi-authorized access states based on the type of the user device.

5. The method of claim 4, wherein the selectively placing comprises selectively placing the port into a semi-authorized access state that limits access by the user device to a network comprising a Voice over Internet Protocol (VoIP) network.

6. The method of claim 4, wherein the selectively placing comprises selectively placing the port into a semi-authorized access state that limits access by the user device to a network comprising the Internet if the user device is a portable computing device.

7. The method of claim 1, wherein the user authentication protocol is IEEE 802.1x.

8. The method of claim 1, wherein the network access device comprises a network switch.

9. A network access device comprising:
   a plurality of input ports;
   a plurality of output ports;
   a switching fabric for routing data received on the plurality of input ports to at least one of the plurality of output ports; and
   control logic adapted to determine, by the network access device, whether a user device coupled to one of the plurality of input ports supports a user authentication protocol used by a host network, and to place, by the network access device, the one of the input ports in a semi-authorized access state if the determination indicates the authentication protocol is not supported, the semi-authorized access state providing the user device with limited network access, the determining comprising polling the user device for the user authentication protocol, the user authentication protocol comprising a protocol to validate the identity of a user of the user device.

10. The device of claim 9, wherein the semi-authorized state limits access by the user device to a network, the network selected from the group comprising a Voice over Internet Protocol (VoIP) network, the Internet, and a low security virtual local area network (VLAN).

11. The device of claim 9, wherein the control logic is adapted to selectively place the one of the input ports into one of a plurality of semi-authorized access states.

12. The device of claim 11, wherein the control logic is adapted to determine a type of the user device and to selectively place the one of the input ports into one of a plurality of semi-authorized access states based on the type of the user device.

13. The device of claim 12, wherein the control logic is adapted to selectively place the one of the input ports into a semi-authorized access state that limits access by the user device to a network comprising a Voice over Internet Protocol (VoIP) network.

14. The device of claim 12, wherein the control logic is adapted to selectively place the one of the input ports into a semi-authorized access state that limits access by the user device to a network comprising the Internet if the user device is a portable computing device.

15. The device of claim 9, wherein the user authentication protocol is IEEE 802.1x.

16. A network system, comprising:
a host network that uses a user authentication protocol;
a network access device communicatively coupled to the host network; and
a user device coupled to a port of the network access device;
wherein the network access device is adapted to:
determine whether the user device supports the user authentication protocol; and
place the port in a semi-authorized access state if the determination indicates the user authentication protocol is not supported, the semi-authorized access state providing the user device with limited network access, the determining comprising polling the user device for the user authentication protocol, the user authentication protocol comprising a protocol to validate the identity of a user of the user device.

17. The network system of claim 16, wherein the semi-authorized state limits access by the user device to a network, the network selected from the group comprising a Voice Over Internet Protocol (VoIP) network, the Internet, and a low-security virtual local area network (VLAN).

18. The network system of claim 16, wherein the network access device is adapted to selectively place the port into one of a plurality of semi-authorized access states.

19. The network system of claim 18, where the network access device is adapted to determine a type of the user device and to selectively place the port into one of a plurality of semi-authorized access states based on the type of the user device.

20. The network system of claim 19, wherein the network access device is adapted to selectively place the port into a semi-authorized access state that limits access by the user device to a network comprising a Voice over Internet Protocol (VoIP) network.

21. The network system of claim 19, wherein the network access device is adapted to selectively place the port into a semi-authorized access state that limits access by the user device to a network comprising the Internet if the user device is a portable computing device.

22. The network system of claim 16, wherein the user authentication protocol is IEEE 802.1x.

23. The network system of claim 16, wherein the network access device is a network switch.

24. An apparatus comprising:
means for sensing a user device coupled to a port of a network access device;
means for determining, by the network access device, if the user device supports a user authentication protocol used by the host network, the determining comprising polling the user device for the user authentication protocol, the user authentication protocol comprising a protocol to validate the identity of a user of the user device; and
means for placing, by the network access device, the port into a semi-authorized access state if the determining indicates that the user device does not support the user authentication protocol, the semi-authorized access state providing the user device with limited network access.

25. A computer implemented method comprising:
at a network access device communicably coupled to a host network, sensing a user device coupled to a port of the network access device; and
at the network access device, allowing the user device limited access to a network via the network access device if it is determined that the user device is unable to communicate using a particular user authentication protocol, the user authentication protocol comprising a protocol to validate the identity of a user of the user device.

26. The method of claim 25, further comprising performing further user authentication in accordance with the user authentication protocol if it is determined that the user device is able to communicate using the user authentication protocol.

27. The method of claim 25 wherein the limited access comprises less access than access afforded a user device that is successfully authenticated using the user authentication protocol.

28. The method of claim 27 wherein the limited access comprises access to a low-security Virtual Local Area Network (VLAN).

29. A network access device comprising:
a memory;
a plurality of input ports;
a plurality of output ports communicably coupled to a host network;
a switching fabric for routing data received on the plurality of input ports to at least one of the plurality of output ports; and
control logic at the network access device configured to:
sense a user device coupled to one of the input ports;
determine if the user device supports a user authentication protocol used by the host network, the user authentication protocol comprising a protocol to validate the identity of a user of the user device; and
place the port into a semi-authorized access state if the determination indicates that the user device does not support the user authentication protocol, the semi-authorized access state providing the user device with limited network access.

30. The network access device of claim 29 wherein the control logic is further configured to perform further user authentication in accordance with the user authentication protocol if it is determined that the user device is able to communicate using the user authentication protocol.

31. The network access device of claim 29 wherein the limited access comprises less access than access afforded a user device that is successfully authenticated using the user authentication protocol.

32. The network access device of claim 31 wherein the limited access comprises access to a low-security Virtual Local Area Network (VLAN).

33. An apparatus comprising:
- a memory;
- means for sensing a user device coupled to a port of the apparatus, the apparatus communicably coupled to a host network; and
- means for determining if the user device supports a user authentication protocol used by the host network, the user authentication protocol comprising a protocol to validate the identity of a user of the user device; and
- means for placing the port into a semi-authorized access state if the determining indicates that the user device does not support the user authentication protocol, the semi-authorized access state providing the user device with limited network access.

* * * * *